May 31, 1938.　　　K. O. HÖRNSTEIN　　　2,119,165
RAKE
Filed Oct. 26, 1936
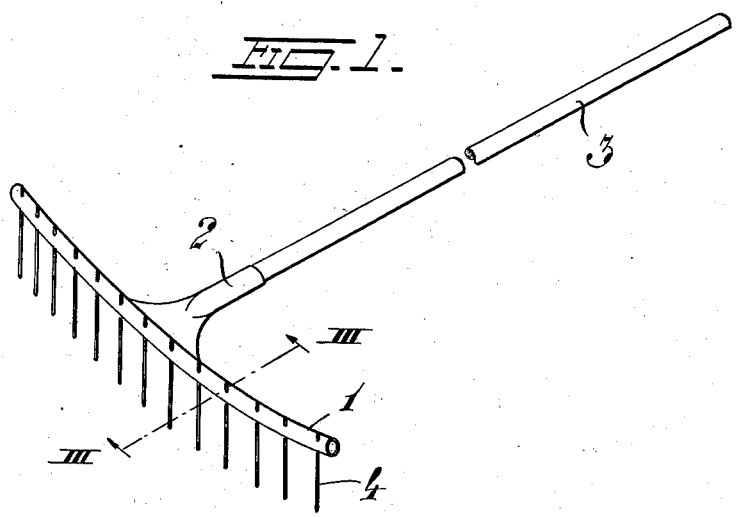
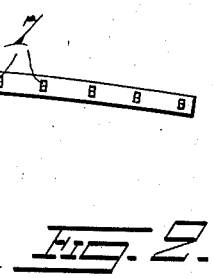
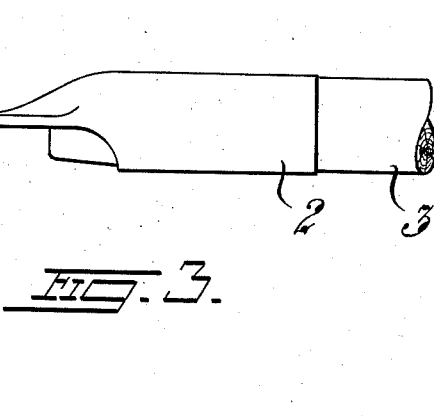
Inventor
Karl O. Hörnstein
By Sommers & Young
Attys.

Patented May 31, 1938

2,119,165

UNITED STATES PATENT OFFICE 2,119,165

RAKE

Karl Oscar Hörnstein, Bjorkoby, Sweden

Application October 26, 1936, Serial No. 107,698
In Sweden June 15, 1935

1 Claim. (Cl. 55—10)

This invention relates to rakes for use on lawns or in gardens.

It has already been proposed to cause the teeth of such rakes to act as springs by winding them into a coil at their upper end, where they are secured to the head of the rake. In the hitherto known constructions of this type, hay and other objects may easily become entangled in the coils, rendering the raking operation difficult, due, in part, to the necessity for frequently cleaning the teeth and, in part, to the fact that the objects thus adhering to the teeth will reduce the flexibility of the teeth.

The object of this invention is to provide a rake of this type by which the difficulties above indicated are avoided. To this end, the upper end portions of the teeth are formed with coils which are inserted into a tubular head so as to be wholly enclosed therein, said head having a series of holes to be engaged by the upper ends of the teeth above the coils and, preferably diametrically opposite said holes, a corresponding series of peripheral slots for guiding the teeth. By this means, the head of the rake may positively prevent the hay or other objects from becoming entangled and sticking fast in the coil or even touching same, without in any way interfering with the spring action of the teeth. The operation of the rake will, therefore, be very soft and easy, the teeth due to their spring action being capable of yielding when meeting with stones or other obstacles firmly embedded in the ground, while at the same time being positively safeguarded against deformation and breakage.

In the accompanying drawing, one embodiment of a rake according to this invention is illustrated. Fig. 1 is a perspective view of the rake. Fig. 2 is a plan view of the head portion of the rake, as seen from below, with part of the handle broken away. Fig. 3 is a cross section of the head with a tooth and the means for securing it to the handle shown in elevation.

The rake shown in the drawing comprises a head 1, having a socket 2 extending rearwardly therefrom and at right angles thereto, a handle 3 fastened in said socket, and a suitable number of teeth 4 carried by the head. The head may preferably be formed from a piece of tubing, slightly curved as shown. At its upper side, the head is provided with a series of holes to receive the upper ends of the teeth so as to firmly hold the same, as shown at 5. Inside the tubular head the teeth which may be formed, for instance, from spring wire, are wound into coils, as shown at 6, Fig. 3. On the under side of the head there is a series of peripheral slots 7 opposite said holes, for laterally guiding the teeth as projecting from the head.

The teeth are so constructed that, after the insertion of their upper ends into the holes of the head, their coils 6 will keep the teeth with a certain pressure in contact with the edge of the slots 7 next to the handle.

In operation, the teeth 4 due to the provision of the coils 6 will be allowed to yieldingly slide to and fro in the slots 7 according to the strain to which they are subjected.

At the same time the hay or other objects are positively prevented by the head from coming into contact with the coils 6 so that entanglement therein is avoided.

What I claim is:—

In a tool of the character set forth in combination, a tubular head, a set of spring teeth carried by said head, said teeth being formed as coils near their upper ends, said coils being entirely enclosed within the tubular head, said head being formed with a set of holes to receive the upper ends of the teeth above the coils when inserted in the head, said head also being formed with a set of peripheral slots corresponding with said holes to permit the insertion of the coils into the tubular head and to act as lateral guides for the teeth projecting therethrough and as abutments to determine the range of movement of the individual teeth when in operation.

KARL OSCAR HÖRNSTEIN.